US009467626B2

(12) United States Patent
Kuznetsov

(10) Patent No.: US 9,467,626 B2
(45) Date of Patent: Oct. 11, 2016

(54) AUTOMATIC RECOGNITION AND CAPTURE OF AN OBJECT

(71) Applicant: LG ELECTRONICS INC., Seoul (KR)

(72) Inventor: Vassily Kuznetsov, Saint Petersburg (RU)

(73) Assignee: LG ELECTRONICS INC., Seoul (KR)

( * ) Notice: Subject to any disclaimer, the term of this patent is extended or adjusted under 35 U.S.C. 154(b) by 86 days.

(21) Appl. No.: 14/016,914

(22) Filed: Sep. 3, 2013

(65) Prior Publication Data

US 2014/0092292 A1 Apr. 3, 2014

(30) Foreign Application Priority Data

Oct. 2, 2012 (RU) ................................. 2012141988

(51) Int. Cl.
*H04N 5/232* (2006.01)
(52) U.S. Cl.
CPC ...... *H04N 5/23293* (2013.01); *H04N 5/23222* (2013.01); *H04N 5/23219* (2013.01)
(58) Field of Classification Search
CPC ....... G06T 7/001; G06T 5/50; G06T 7/0028; G06T 2200/24; G06T 2207/20021; G06T 7/0026; H04N 1/387; H04N 1/3872; H04N 21/4728; H04N 7/185; H04N 5/23219
USPC .................... 348/345, 333.02, 222.1
See application file for complete search history.

(56) References Cited

U.S. PATENT DOCUMENTS

| 7,596,240 B2* | 9/2009 | Ito et al. ................. 382/103 |
| 2008/0208791 A1 | 8/2008 | Das et al. |
| 2009/0074258 A1* | 3/2009 | Cotgreave ............... 382/118 |
| 2010/0054550 A1* | 3/2010 | Okada .................... 382/118 |
| 2010/0156834 A1* | 6/2010 | Sangster ........... G06K 9/00677 345/173 |
| 2012/0032960 A1* | 2/2012 | Kameyama ............ 345/428 |
| 2012/0226680 A1 | 9/2012 | Bennett |
| 2013/0235227 A1* | 9/2013 | Chang et al. ............ 348/222.1 |

FOREIGN PATENT DOCUMENTS

| RU | 2 438 176 C2 | 12/2011 |
| RU | 2 441 268 C2 | 1/2012 |
| WO | WO 2009/089142 A2 | 7/2009 |

* cited by examiner

*Primary Examiner* — Twyler Haskins
*Assistant Examiner* — Padma Haliyur
(74) *Attorney, Agent, or Firm* — Birch, Stewart, Kolasch & Birch, LLP

(57) ABSTRACT

A method, system, and device for automatic recognition and capture of an object are disclosed. In one embodiment, a mobile terminal comprises a display unit, a memory, a camera module, and a controller. The controller is configured to set at least one image of an expected object in response to a user input thereof, receive an image of a object via the camera module, generate a match indication when the image of the object matches with the at least one image of the expected object beyond a threshold value, and capture the image of the object upon confirmation of the match indication.

10 Claims, 18 Drawing Sheets

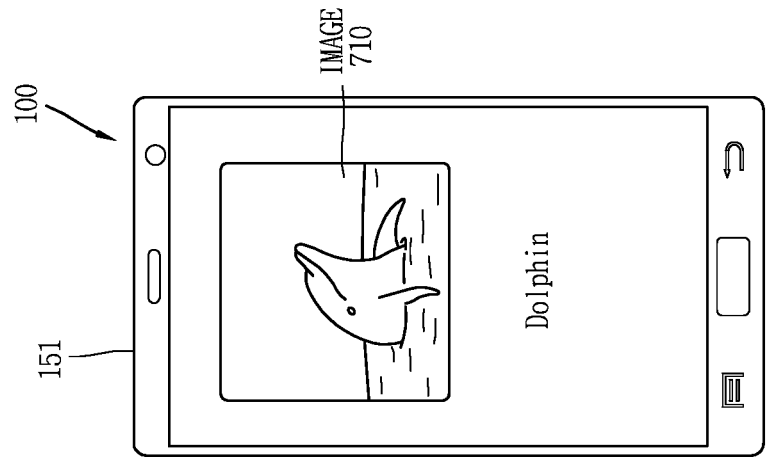
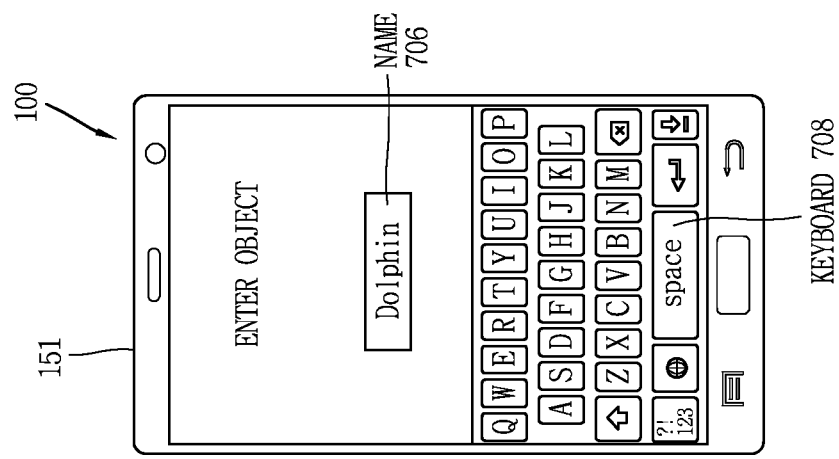
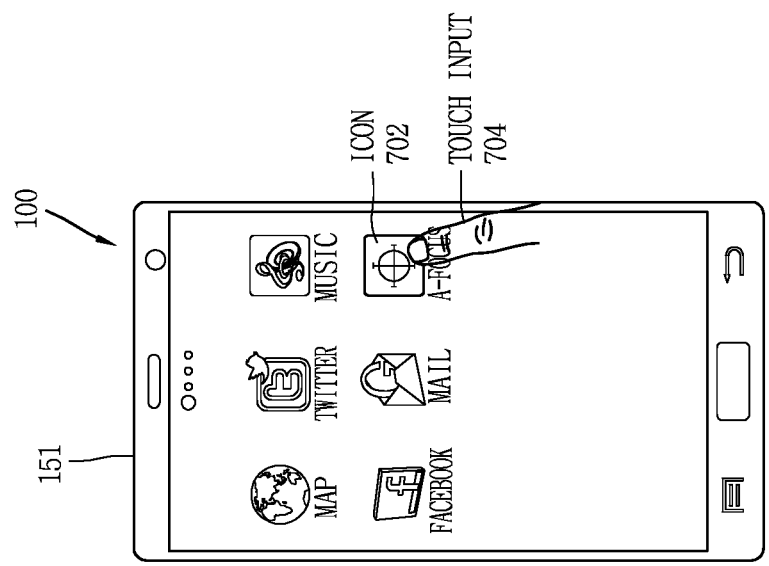

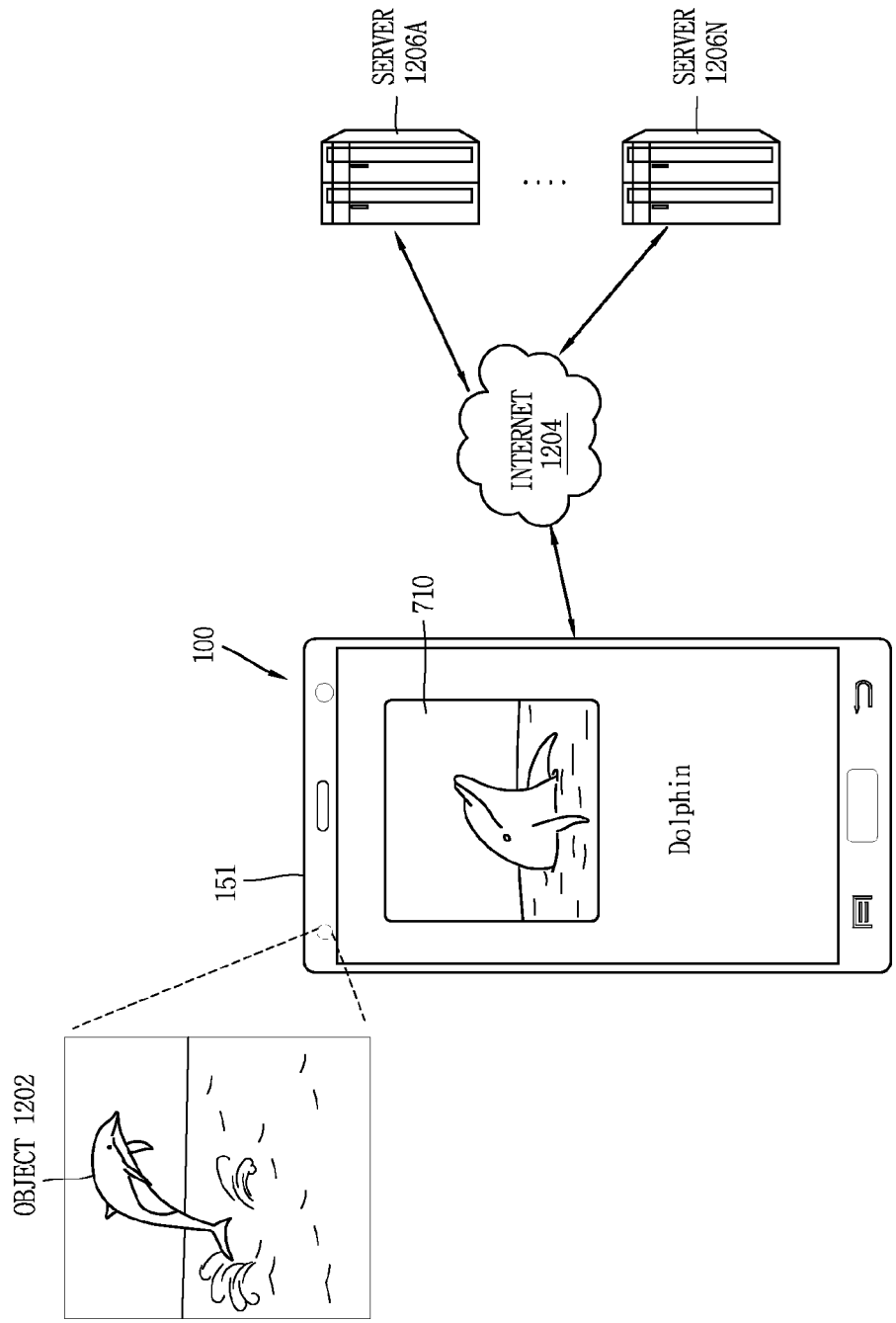

AUTOMATIC RECOGNITION AND CAPTURE OF AN OBJECT

CROSS-REFERENCE TO RELATED APPLICATIONS

Pursuant to 35 U.S.C. §119(d), this application claims the benefit of priority from Russian Patent Application No. 2012141988, filed on Oct. 2, 2012, the contents of which is hereby incorporated by reference herein in its entirety.

TECHNICAL FIELD

Embodiments of the disclosure generally relate to the field of electronics, and more particularly to control methods and systems of mobile devices.

BACKGROUND

Terminal may comprise a mobile terminal or a stationary terminal. The mobile terminal may be further divided into a handheld terminal or vehicle mount terminal. As the features of the mobile terminal are becoming more diverse, the mobile terminal is becoming a multimedia player performing various functions, such as capturing images and video, playing music or media files, playing games, receiving broadcast programs, and so on. Especially, the camera function of the mobile terminal is increasingly emphasized nowadays. However, when an object the user wants to capture is rapidly moving or in and out of sight, it may become extreme difficult to get a good picture of the object.

SUMMARY

This summary is provided to comply with 37 C.F.R. §1.73, requiring a summary of the disclosure briefly indicating the nature and substance of the disclosure. It is submitted with the understanding that it will not be used to interpret or limit the scope or meaning of the claims.

A method, system, and device for automatic recognition and capture of an object are disclosed. In one aspect, a mobile terminal comprises a display unit, a memory, a camera module, and a controller. The controller is configured to set at least one image of an expected object in response to a user input thereof, receive an image of an object via the camera module, generate a match indication when the image of the object matches with the at least one image of the expected object beyond a threshold value, and capture the image of the object upon confirmation of the match indication.

In another aspect, a method of a mobile terminal comprises setting at least one image of an expected object in response to a user input thereof, receiving an image of an object via a camera module of the mobile terminal, generating a match indication when the image of the object matches with the at least one image of the expected object beyond a threshold value, and capturing the image of the object upon confirmation of the match indication.

In yet another aspect, a method of a mobile terminal comprises setting an image of a first expected object, an image of a second expected object, and a matching condition in response to a user input thereof, receiving an image of a first object and an image of a second object via a camera module of the mobile terminal, generating a match indication when the image of the first object and the image of the second object match with the image of the first expected object and the image of the second expected object according to the matching condition, and capturing the image of the object upon confirmation of the match indication.

Other features of the embodiments will be apparent from the accompanying drawings and from the detailed description that follows.

BRIEF DESCRIPTION OF THE VIEWS OF DRAWINGS

Example embodiments are illustrated by way of example and not limitation in the figures of the accompanying drawings, in which like references indicate similar elements and in which:

FIGS. 7a-7c illustrate exemplary views of the mobile terminal selecting an expected object, according to one embodiment.

FIG. 12 illustrates an exemplary view of the mobile terminal automatically recognizing an expected object, according to one embodiment.

Figure 1:
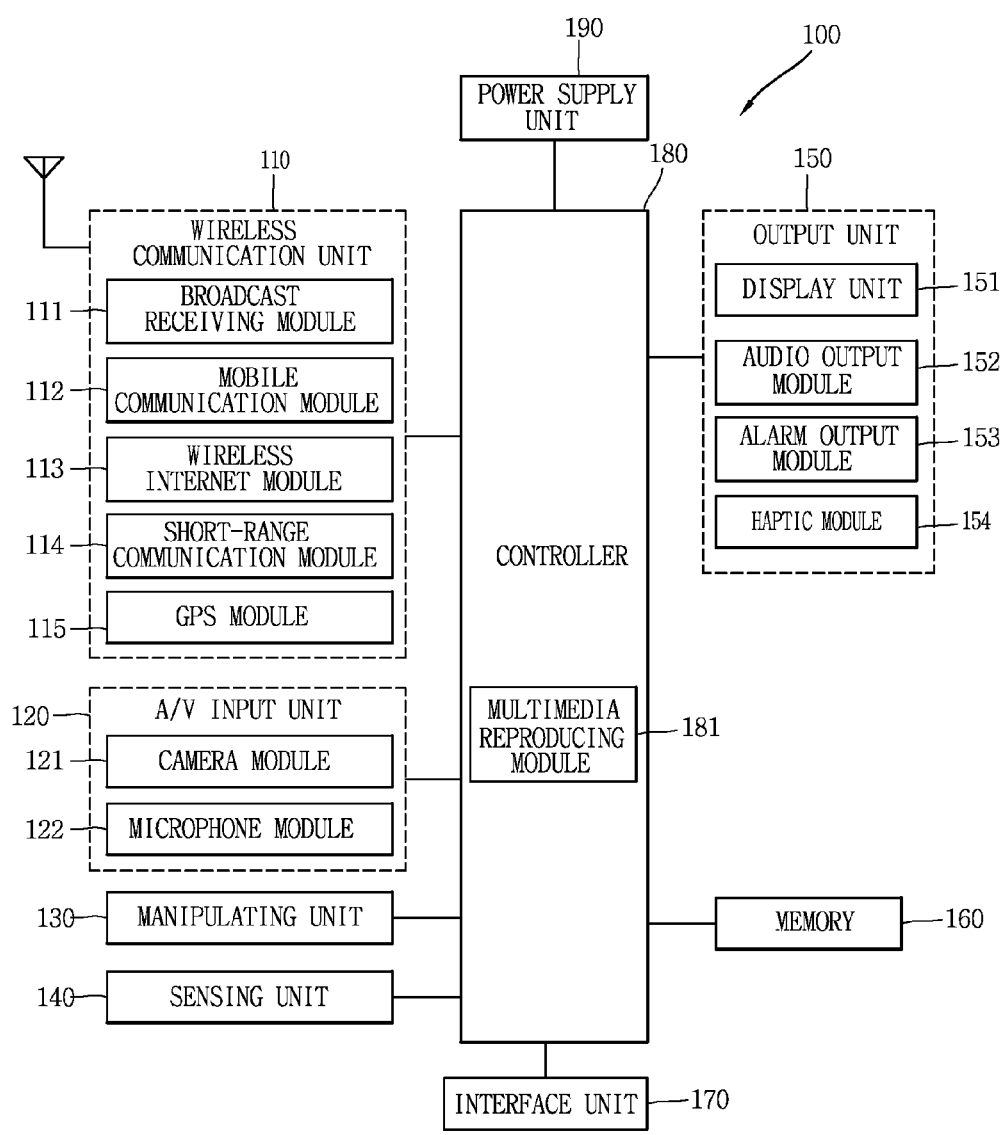
FIG. 1 illustrates an exemplary schematic block diagram of a mobile terminal according to one embodiment.

Other features of the present embodiments will be apparent from the accompanying drawings and from the detailed description that follows. Further, the drawings described herein are for illustration purposes only and are not intended to limit the scope of the present disclosure in any way.

DETAILED DESCRIPTION

A method, system, and device for automatic recognition and capture of an object are disclosed. According to various embodiments of the present disclosure, a set or library of object images is created in a mobile terminal. Then, a user may select an expected object (e.g., a racing car, an airplane, a jumping dolphin, etc.) for automatic recognition. The picture of the expected object may be taken automatically or manually. For example, when the user visits an event, the user may want to take pictures of one or more objects for the event, but the capture of the objects may not be easy when those objects move fast in and out of the user's sight. In the embodiments of the present disclosure, the mobile terminal is taught to recognize a desirable or expected object and take a picture when the object appears.

Hereinafter, the embodiments disclosed herein will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the embodiments disclosed herein, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the technological spirit disclosed herein by the accompanying drawings.

A mobile terminal disclosed herein may include a portable phone, a smart phone, a laptop computer, a digital broadcast terminal, a personal digital assistant (PDA), a portable multimedia player (PMP), or a navigation device. However, it would be easily understood by those skilled in the art that a configuration according to the following description may be applicable to a stationary terminal such as a digital TV, a desktop computer, and the like, excluding constituent elements particularly configured for mobile purposes.

FIG. 1 illustrates an exemplary schematic block diagram of a mobile terminal 100 according to one embodiment. The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile terminal may be implemented with greater or less number of elements than those illustrated elements.

Hereinafter, the constituent elements will be described in sequence. The wireless communication unit 110 typically includes one or more elements allowing radio communication between the mobile terminal 100 and a wireless communication system, or allowing radio communication between radio communication the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112. The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

The broadcast signal and/or broadcast-associated information received through the broadcast receiving module 111 may be stored in the memory 160. The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception. The mobile communication module 112 may be configured to implement a video communication mode and a voice communication mode. The video communication mode refers to a configuration in which communication is made while viewing an image of the counterpart, and the voice communication mode refers to a configuration in which communication is made without viewing an image of the counterpart. The mobile communication module 112 may be configured to transmit or receive at least one of voice or image data to implement the video communication mode and voice communication mode.

The wireless Internet module 113 means a module for supporting wireless Internet access. The wireless Internet module 113 may be built-in or externally installed to the mobile terminal 100. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like. The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like. The location information module 115 is a module for checking or acquiring a location of the mobile terminal, and there is a GPS module as a representative example.

Referring to FIG. 1, the A/V (audio/video) input unit 120 receives an audio or video signal, and the A/V (audio/video) input unit 120 may include a camera 121 and a microphone 122. The camera 121 processes an image frame, such as still picture or video, obtained by an image sensor in a video phone call or image capturing mode. The processed image frame may be displayed on a display unit 151. The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal. The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed state of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. The output unit 150 is configured to provide an output for audio signal, video signal, or alarm signal, and the output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a terminal body through a region occupied by the display unit 151 of the terminal body. Two or more display units 151 may be implemented according to a configured aspect of the mobile terminal 100. For instance, a plurality of the display units 151 may be arranged on one surface to be spaced apart from or integrated with each other, or may be arranged on different surfaces.

When the display unit 151 and a touch sensitive sensor (hereinafter, referred to as a "touch sensor") have an inter-layer structure (hereinafter, referred to as a "touch screen"), the display unit 151 may be used as an input device rather than an output device. The touch sensor may be implemented as a touch film, a touch sheet, a touch pad, and the like. The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure. When there is a touch input to the touch sensor, the corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the mobile terminal 100 covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor. The examples of the proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer. The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm 153 outputs signals notifying occurrence of events from the mobile terminal 100. The events occurring from the mobile terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner. The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like. The haptic module 154 may be configured to transmit tactile effects through a user's direct contact, or a user's muscular sense using a finger or a hand. The haptic module 154 may be implemented in two or more in number according to the configuration of the mobile terminal 100.

The memory 160 may store a program for processing and controlling the controller 180. Alternatively, the memory 160 may temporarily store input/output data (e.g., phonebook data, messages, audios, still images, videos, and the like). Also, the memory 160 may store data related to various patterns of vibrations and sounds outputted upon the touch input on the touch screen. The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like. The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as identification device) may be implemented in a type of smart card. Hence, the identification device can be coupled to the mobile terminal 100 via a port. Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 for reproducing multimedia data. The multimedia module 181 may be implemented in an integrated manner within the controller 180 or may be implemented in a separate manner from the controller 180. Furthermore, the controller 180 can perform a pattern recognition processing so as to recognize writing or drawing input on the touch screen as text or image. Furthermore, the controller 180 may implement a lock state for limiting the user's control command input to applications when the state of the mobile terminal satisfies the prescribed condition. Furthermore, the controller 180 may control a lock screen displayed in the lock state based on a touch input sensed over the display unit 151 (hereinafter, referred to as a "touch screen") in the lock state. The power supply unit 190 receives external power and internal power under the control of the controller 180 to provide power required by various components.

Various embodiments described herein may be implemented in a medium that can be read by a computer or similar device using software, hardware, or any combination thereof. For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units designed to perform the functions described herein. In some cases, such embodiments may be implemented in the controller 180 itself. For software implementation, the embodiments such as procedures or functions may be implemented together with separate software modules. The software modules may perform at least one function or operation described herein. Software codes can be implemented by a software application written in any suitable programming language. The software codes may be stored in the memory 160 and executed by the controller 180. Hereinafter, a mobile terminal according to an embodiment of the present disclosure described in FIG. 1, or a mobile terminal disposed with constituent elements of the mobile terminal, or the structure of a mobile terminal will be described.

Figure 2A:
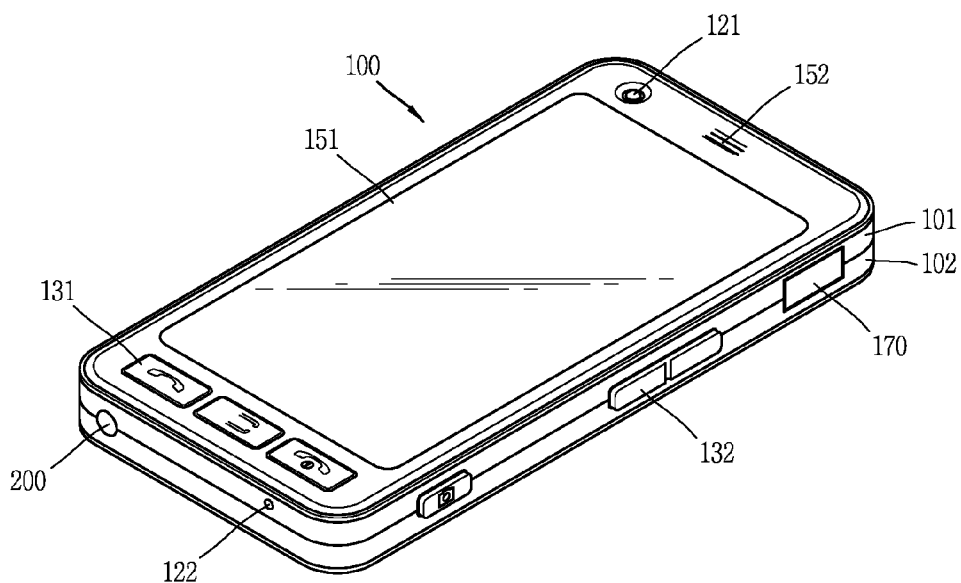
FIG. 2a is a front perspective view illustrating an example of the mobile terminal.
Figure 2B:
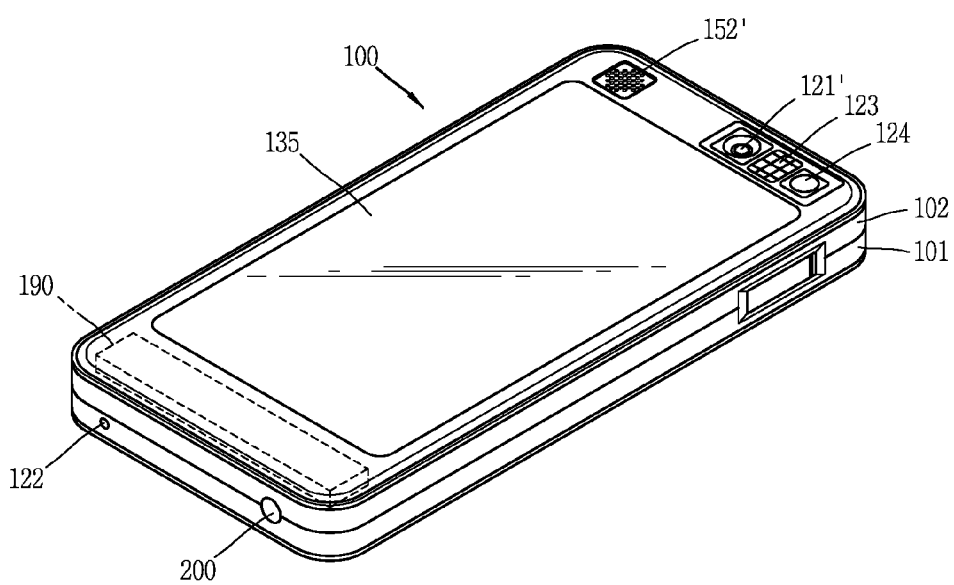
FIG. 2b is a rear perspective view illustrating the mobile terminal in FIG. 2a, according to an embodiment of the present disclosure.

FIG. 2a is a front perspective view illustrating an example of the mobile terminal 100, and FIG. 2b is a rear perspective view illustrating the mobile terminal 100 in FIG. 2a, according to an embodiment of the present disclosure. The mobile terminal 100 disclosed herein is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

According to the drawing, the terminal body 100 (hereinafter, referred to as a "body") may include a front surface, a lateral surface, and a rear surface. Furthermore, the body may include both ends thereof formed along the length direction. The body 100 includes a case (casing, housing, cover, etc.) forming an appearance of the terminal. In this embodiment, the case may be divided into a front surface (hereinafter, referred to as a "front case") 101 and a rear surface (hereinafter, referred to as a "rear case") 102. Various electronic components may be incorporated into a space formed between the front case 101 and rear case 102. At least one middle case may be additionally disposed between the front case 101 and the rear case 102. The cases may be formed by injection-molding a synthetic resin or may be also formed of a metal material such as stainless steel (STS), titanium (Ti), or the like.

A display unit 151, an audio output module 152, a camera 121, a user input unit 130 (130/131, 132), a microphone 122, an interface 170, and the like may be arranged on the terminal body 100, mainly on the front case 101. The display unit 151 occupies a most portion of the front case 101. The audio output unit 152 and the camera 121 are disposed on a region adjacent to one of both ends of the display unit 151, and the user input unit 131 and the microphone 122 are disposed on a region adjacent to the other end thereof. The user interface 132 and the interface 170, and the like, may be disposed on a lateral surface of the front case 101 and the rear case 102. On the contrary, the microphone 122 may be disposed at the other end of the body 100.

The user input unit 130 is manipulated to receive a command for controlling the operation of the portable terminal 100, and may include a plurality of manipulation units 131, 132. The manipulation units 131, 132 may be commonly designated as a manipulating portion, and any method may be employed if it is a tactile manner allowing the user to perform manipulation with a tactile feeling. The content inputted by the manipulation units 131, 132 may be set in various ways. For example, the first manipulation unit 131 may receive a command, such as start, end, scroll, or the like, and the second manipulation unit 132 may receive a command, such as controlling a volume level being outputted from the audio output unit 152, or switching it into a touch recognition mode of the display unit 151.

Furthermore, an audio output unit 152' may be additionally disposed on a rear surface of the terminal body. The audio output unit 152' together with the audio output unit 152 (refer to FIG. 2a) can implement a stereo function, and it may be also used to implement a speaker phone mode during a phone call. Furthermore, a power supply unit 190 for supplying power to the mobile terminal 100 may be mounted on a rear surface of the terminal body. The power supply unit 190 may be configured so as to be incorporated in the terminal body, or directly detachable from the outside of the terminal body. Furthermore, a touch pad 135 for detecting a touch may be additionally mounted on the rear case 102. The touch pad 135 may be configured in an optical transmission type similarly to the display unit 151. In this case, if the display unit 151 is configured to output visual information from both sides of the display unit 151, then the visual information may be also recognized through the touch pad 135. The information being outputted from the both sides thereof may be controlled by the touch pad 135. In addition, a display may be additionally mounted on the touch pad 135, and a touch screen may be also disposed on the rear case 102.

Furthermore, a camera 121' may be additionally mounted on the rear case 102 of the terminal body. The camera 121' has an image capturing direction, which is substantially opposite to the direction of the camera 121 (refer to FIG. 2a), and may have different pixels from those of the first video input unit 121. For example, that the camera 121 may preferably have a relatively small number of pixels enough not to cause a difficulty when the user captures his or her own face and sends it to the other party during a video call or the like, and the camera 121' has a relatively large number of pixels since the user often captures a general object that is not sent immediately. The cameras 121' may be provided in the terminal body 100 in a rotatable and popupable manner. Furthermore, a flash 123 and a mirror 124 may be additionally disposed adjacent to the camera 121'. The flash 123 illuminates light toward an object when capturing the object with the camera 121'. The mirror allows the user to look at his or her own face, or the like, in a reflected way when capturing himself or herself (in a self-portrait mode) by using the camera 121'.

A touch pad 135 for detecting a touch may be additionally mounted on the rear case 102. The touch pad 135 may be configured in an optical transmission type similarly to the display unit 151. In this case, if the display unit 151 is configured to output visual information from both sides of the display unit 151, then the visual information may be also recognized through the touch pad 135. The information being outputted from the both sides thereof may be controlled by the touch pad 135. In addition, a display may be additionally mounted on the touch pad 135, and a touch screen may be also disposed on the rear case 102. The touch pad 135 operates in a reciprocal relation to the display unit 151 of the front case 101. The touch pad 135 may be disposed in parallel on a rear side of the display unit 151. The touch pad 135 may have the same or a smaller size as or than that of the display unit 151.

Figure 3:
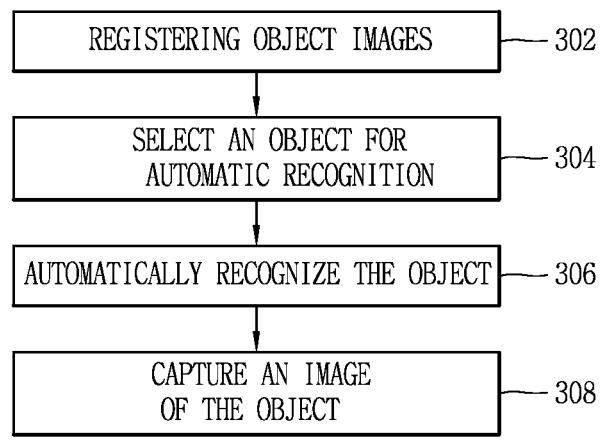
FIG. 3 illustrates an exemplary process executed by the mobile terminal to automatically recognize and capture an object, according to one embodiment.
Figure 15:
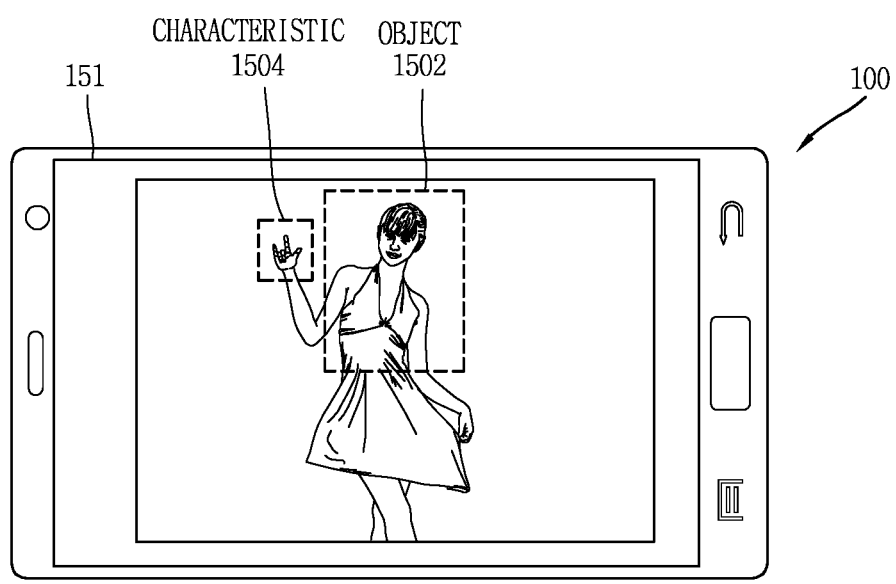
FIG. 15 illustrates an exemplary view of the mobile terminal automatically recognizing an expected object and a characteristic of the expected object, according to one embodiment.
Figure 16:
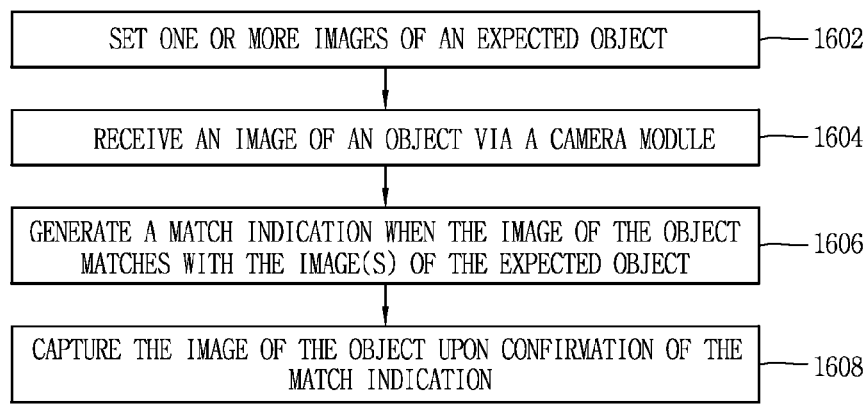
FIG. 16 illustrates a process flow chart of an exemplary method executed by the mobile terminal to automatically recognize and capture an object, according to one embodiment.

FIG. 3 illustrates a process flow chart of an exemplary method executed by the mobile terminal 100 to automatically recognize and capture an object, according to one embodiment. In process 302, as will be illustrated in FIGS. 4a-6, one or more object images are registered to the mobile terminal 100. In process 304, as illustrated in FIGS. 7a-11c, at least one expected object is selected by the mobile terminal for automatic recognition. In process 306, as illustrated in FIG. 12, the object is automatically recognized by the mobile terminal 100. In process 308, as illustrated in FIGS. 15 and 16, an image of the expected object is captured by the mobile terminal 100. It is also appreciated that the methods disclosed in FIG. 3 may be implemented in a form of a machine-readable medium embodying a set of instructions that, when executed by a machine, cause the machine to perform any of the operations disclosed herein.

Figure 4A:
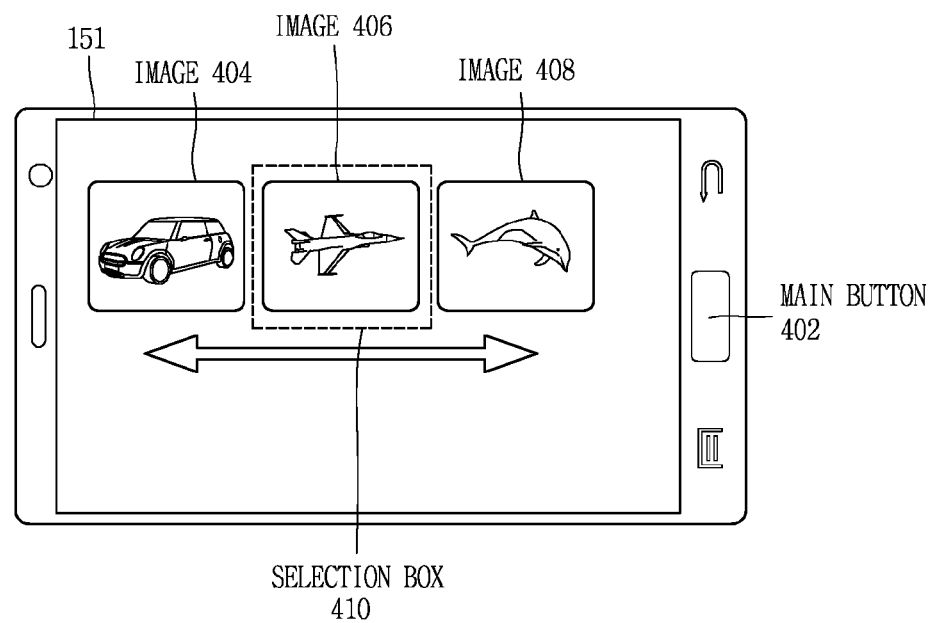
FIGS. 4a and 4b illustrate exemplary views of the mobile terminal registering an object for automatic recognition and capture, according to one embodiment.
Figure 4B:
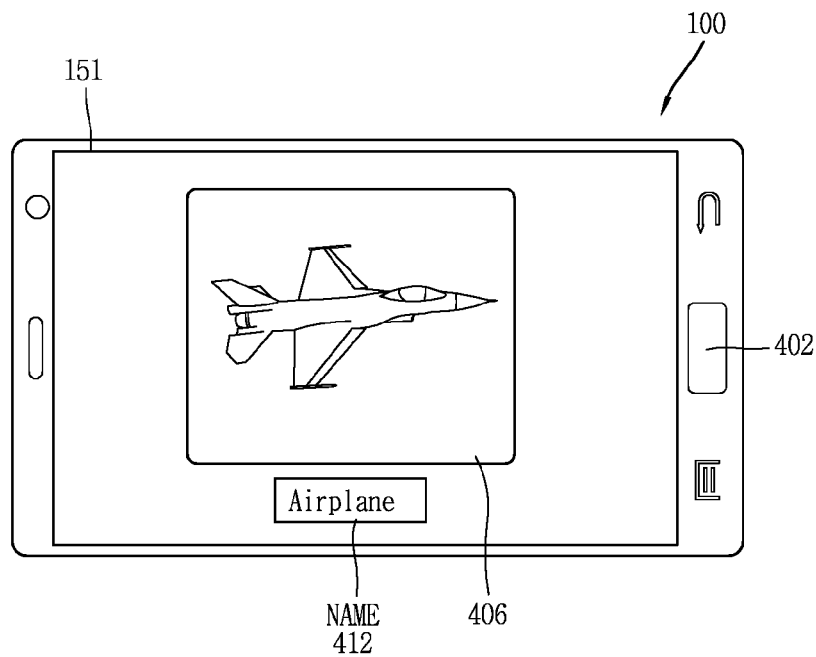

FIGS. 4a and 4b illustrate exemplary views of the mobile terminal 100 registering an object for automatic recognition and capture, according to one embodiment. In one embodiment, one or more images of objects are pre-registered to a mapping table stored in the memory through identifying the images with metadata. In FIG. 4a, the user may select the images of objects from a collection of object images (e.g., a photo album) stored in the mobile terminal 100. Alternatively, the images may be provided with an application executing various embodiments described herein. Further, the images may be downloaded through the Internet or uploaded by the user. In FIG. 4a, one of the images (e.g., an image 406 of an airplane) is preselected among the images which include images 404-408. When the image 406 is preselected for registration, a selection box 410 is displayed to distinguish the selection of the image 406.

The preselected image 406 may be confirmed by pressing a main button 402 or pressing an area within the selection box 410. Once the image 406 is selected for registration, the image 406 may be registered to a mapping table stored in the memory 160 by matching the image 406 with a corresponding metadata (e.g., a name 412). In FIG. 4b, the name 412 is entered, for example by operating a keyboard, to map the image 406 of the airplane with the name 412. In another exemplary implementation, the name 412 may be uttered when the image 406 is displayed on the display unit 151. In one embodiment, the image 406 comprises a picture of the object, a contour of the object, and a 3-D image of the object.

Figure 5A:
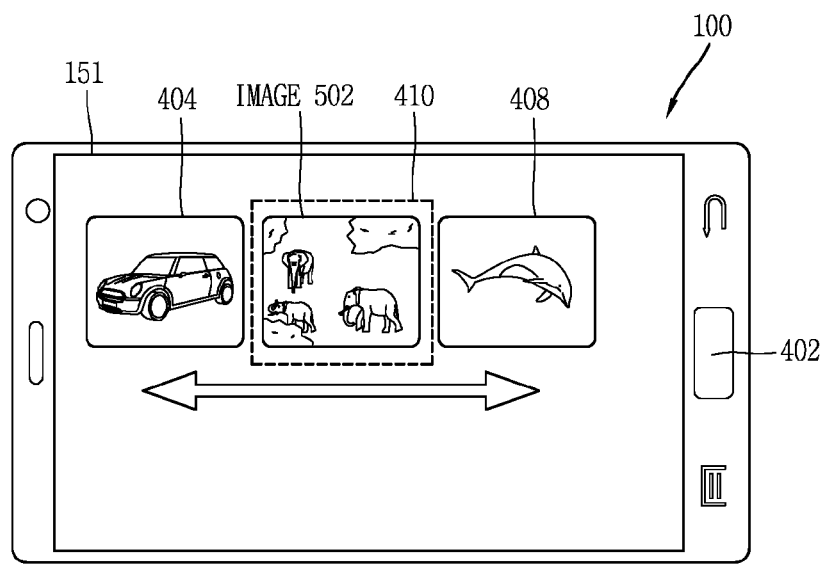
FIGS. 5a-5c illustrate exemplary views of the mobile terminal registering an object selected from an image, according to one embodiment.
Figure 5B:
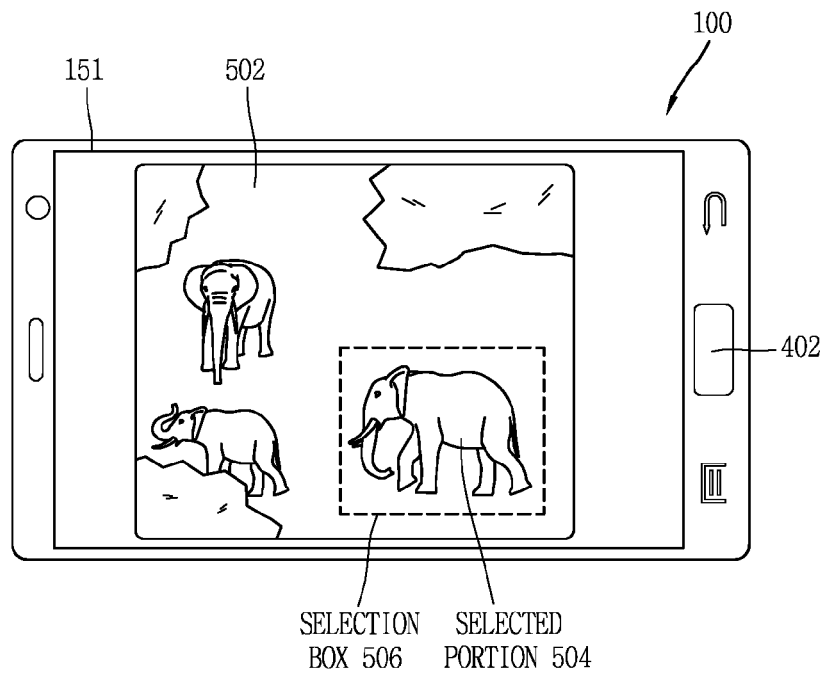
Figure 5C:
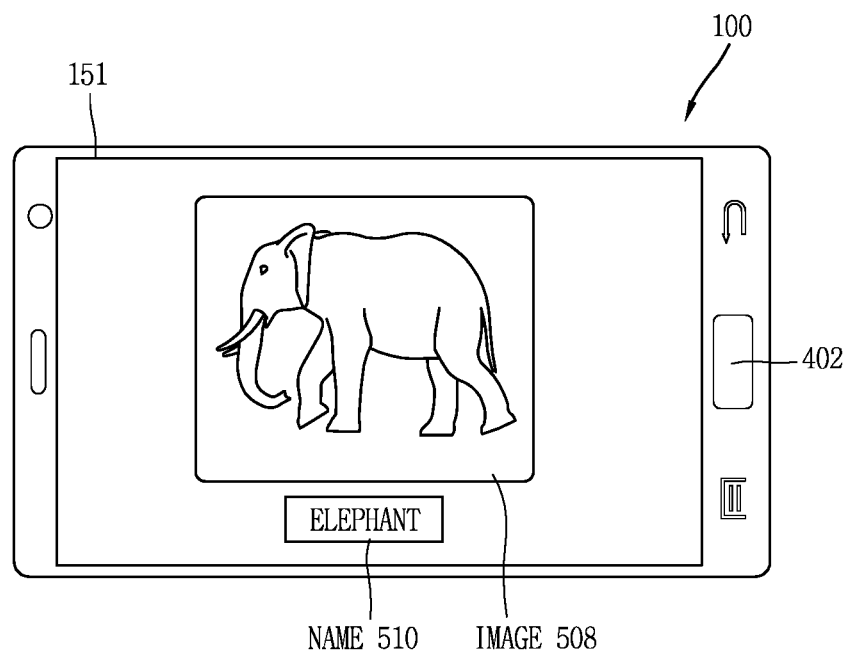

FIGS. 5a-5c illustrate exemplary views of the mobile terminal 100 registering an object selected from an image, according to one embodiment. In one embodiment, one of more objects are pre-registered to the mapping table stored in the memory 160 through selecting a portion of an image comprising a plurality of objects. In FIG. 5a, an image 502 comprising multiple objects is selected for further processing. In FIG. 5b, an object among the multiple objects is selected, which is indicated as a selected portion 504 distinguished by a selection box 506, and affirmed (e.g., by pressing the main button 402 or by touching the selection box 506). In FIG. 5c, once the selected portion 504 is confirmed for registration, an image 508 of the selected portion 504 may be registered to a mapping table stored in the memory 160 by matching the image 508 with a corresponding metadata (e.g., a name 510). The name 510 may be entered by typing the name 510 (e.g., elephant) which corresponds to the image 508. In another exemplary implementation, the name 510 may be uttered when the image 508 is displayed on the display unit 151.

Figure 6:
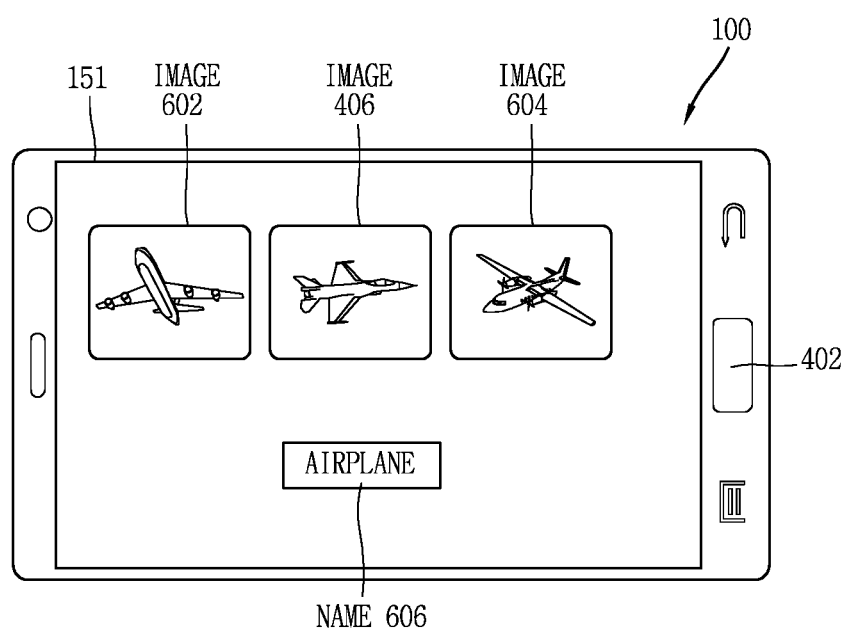
FIG. 6 illustrates exemplary views of the mobile terminal registering multiple images of an object, according to one embodiment.

FIG. 6 illustrates exemplary views of the mobile terminal 100 registering multiple images of an object, according to one embodiment. In one embodiment, the user may select multiple images of an object from a collection of images (e.g., a photo album) stored in the mobile terminal 100 to register to a metadata. In FIG. 6, an image 602, an image 604, and an image 606 of an airplane are preselected for registration. Then, the image 602, the image 604, and the image 606 may be registered to the mapping table stored in the memory 160 by matching the images with a corresponding metadata (e.g., a name 606). In one exemplary implementation, the name 606 (e.g., airplane) is entered, for example by using a keyboard, to map the images with the name 606. In another exemplary implementation, the name 606 may be uttered when the images are displayed on the display unit 151.

FIGS. 7a-7c illustrate exemplary views of the mobile terminal 100 selecting an expected object, according to one embodiment. In FIG. 7a, an application for automatic recognition and capture of the expected object is initiated by pressing an icon 702 representing the application (e.g., A-Focus) with a touch input 704. In FIG. 7b, a name 706 of the expected object (e.g., a dolphin) is entered using a virtual keyboard 708. In FIG. 7c, once the name 706 is entered, an image 710 of the dolphin appears on the display unit 151 to indicate and/or confirm the selection of the expected object.

Figure 8A:
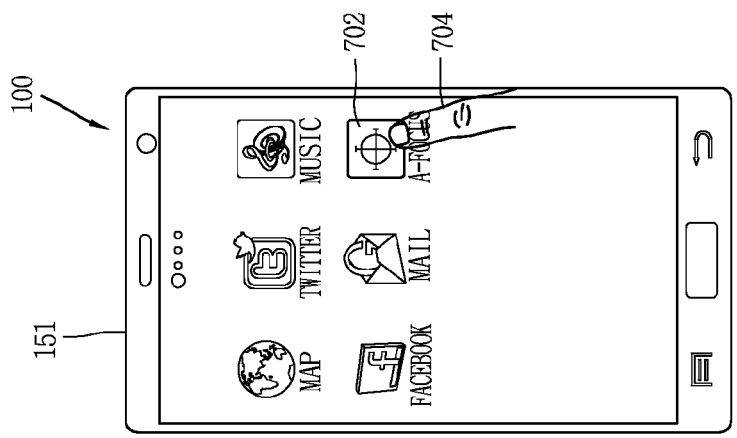
FIGS. 8a-8c illustrate other exemplary views of the mobile terminal selecting an expected object, according to one embodiment.
Figure 8B:
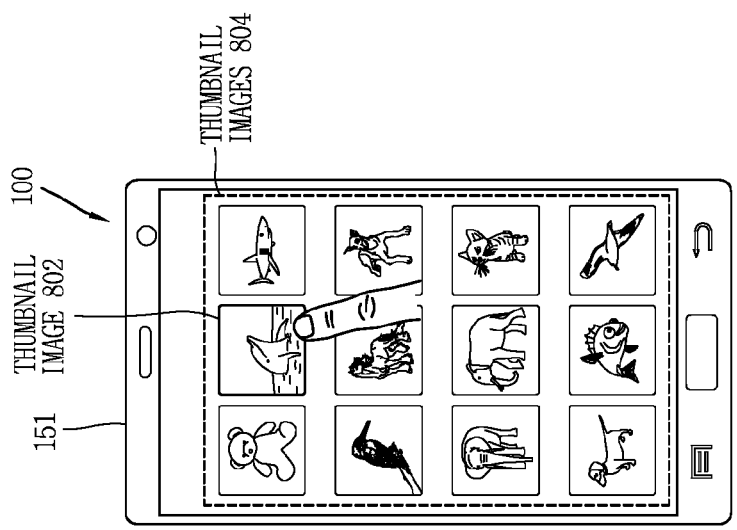
Figure 8C:
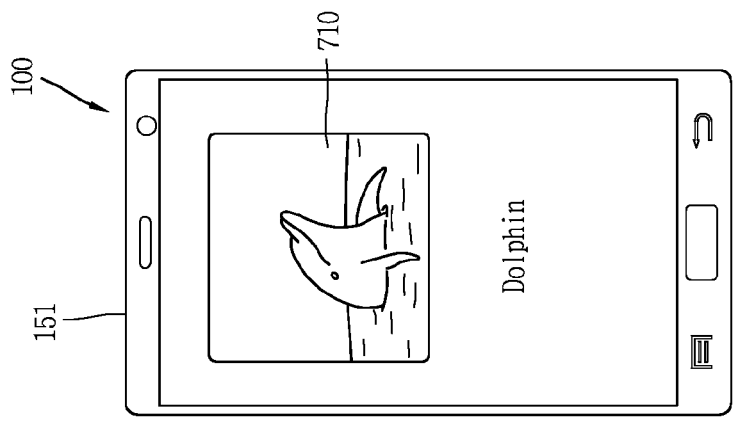

FIGS. 8a-8c illustrate other exemplary views of the mobile terminal 100 selecting an expected object, according to one embodiment. In FIG. 8a, the application for automatic recognition and capture of the expected object is initiated by pressing the icon 702 representing the application (e.g., A-Focus) with the touch input 704. In FIG. 8b, thumbnail images 804 of the images of objects registered in the mobile device 100 is displayed on the display unit 151. Then, a thumbnail image 802 of the expected object (e.g., a dolphin) is selected by touching the thumbnail image 802 using a touch input. In FIG. 8c, once the thumbnail image 802 is selected and/or confirmed, the image 710 of the dolphin appears on the display unit 151 to indicate and/or confirm the selection of the expected object.

Figure 9A:
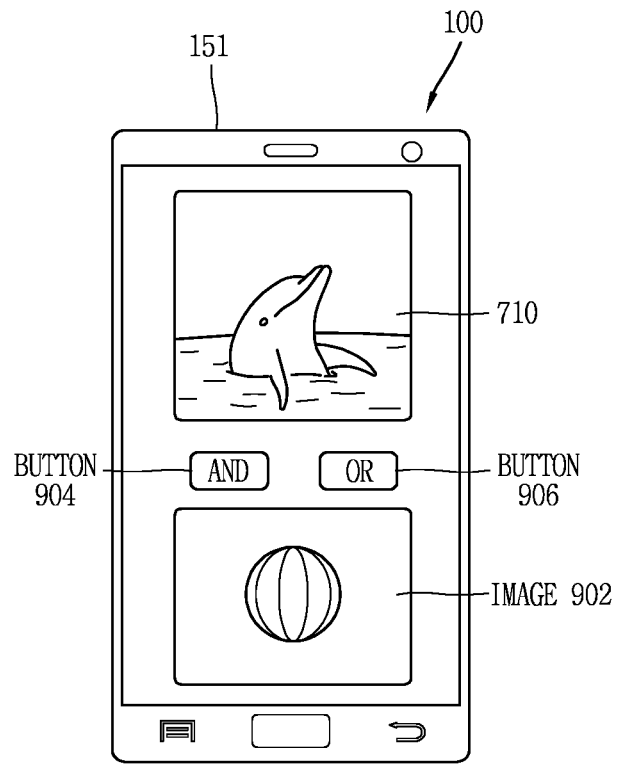
FIGS. 9a and 9b illustrate exemplary views of the mobile terminal selecting two expected objects and a matching condition, according to one embodiment.
Figure 9B:
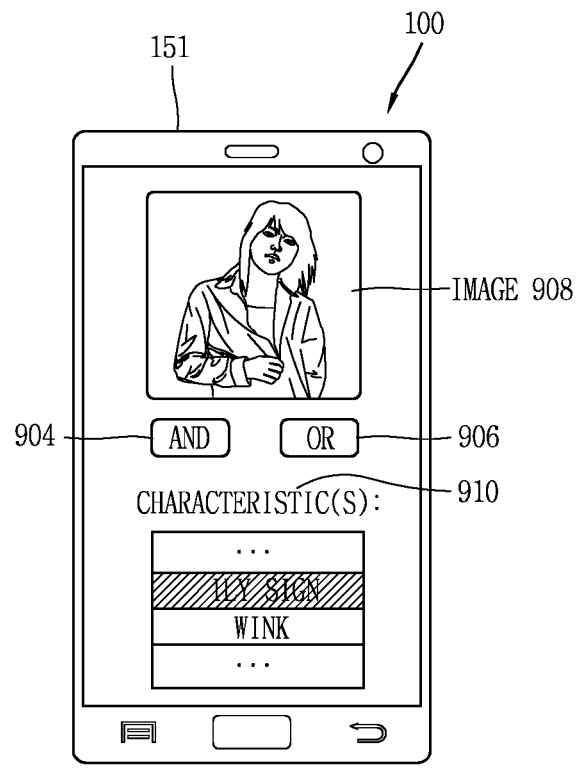

FIGS. 9a and 9b illustrate exemplary views of the mobile terminal 100 selecting one or more expected objects and a matching condition, according to one embodiment. In one embodiment, multiple expected objects and a matching condition are selected for automatic recognition and capture. In FIG. 9a, when two expected objects are selected, the images of the two expected objects, which include the image 710 of the dolphin and an image 902 of a beach ball, are displayed on the display unit 151. In addition, matching conditions, which include a button 904 representing "AND" condition and a button 906 representing "OR" condition, are displayed on the display unit 151.

In one exemplary implementation, when the AND button 904 is selected, each of the two expected objects needs to be recognized beyond a threshold value (e.g., 70 percent recognition rate). For example, when a first object and a second object are recognized by the mobile terminal 100 to match the two expected objects represented by image 702 and the image 902 with the recognition rate of 75% and 67%, respectively, neither the first object nor the second object would be captured by the mobile terminal 100 when the AND button 904 was selected as the matching condition. In another example, when the first object and the second object are recognized by the mobile terminal 100 to match the two expected objects represented by image 702 and the image 902 with the recognition rate of 75% and 67%, respectively, only the first object would be captured by the mobile terminal 100 when the OR button 906 was selected as the matching condition. It is appreciated that more than two expected objects may be selected for automatic recognition and capture. It is further appreciated that there may be more than two matching conditions that can be selected by the user of the mobile terminal 100, and the threshold level for the recognition of the expected object may be configured by the user.

In FIG. 9b, when one expected object is selected by selecting an image 908 of a woman, the image 908, a characteristic 910 of the woman (e.g., ILY (I Love You) sign), and the matching conditions, which include the button 904 representing "AND" condition and the button 906 representing "OR" condition, are displayed on the display unit 151. In one exemplary implementation, when the AND button 904 is selected, the expected object flashing the ILY sign needs to be recognized beyond a threshold value (e.g., 70 percent recognition rate). For example, when the expected object is recognized by the mobile terminal 100 by 75% recognition rate, but the ILY sign is recognized by less than 70%, the mobile terminal 100 would not capture the expected object when the AND button 906 was selected as the matching condition. In another example, when the expected object is recognized by the mobile terminal 100 by 75% recognition rate, but the ILY sign is recognized by less than 70%, the mobile terminal 100 would capture the expected object when the OR button 906 was selected as the matching condition. It is appreciated that more than two expected objects may be selected for automatic recognition and capture. It is further appreciated that there may be more than two matching conditions that can be selected by the user of the mobile terminal 100, and the threshold level for the recognition of the expected object may be configured by the user. Moreover, it is appreciated that there may be more than two characteristics that can be selected by the user of the mobile terminal 100, and the threshold level for the recognition of the expected object may be configured by the user. In one embodiment, the characteristic comprises a facial expression (e.g., wink, smile, etc.), a gesture, a motion, etc.

Figure 10A:
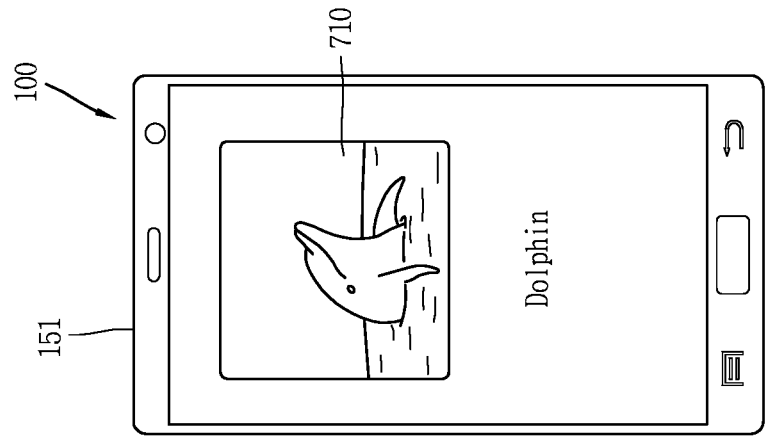
FIGS. 10a-10c illustrate exemplary views of the mobile terminal selecting an expected object from a group of thumbnail images associated with a search word, according to one embodiment.
Figure 10B:
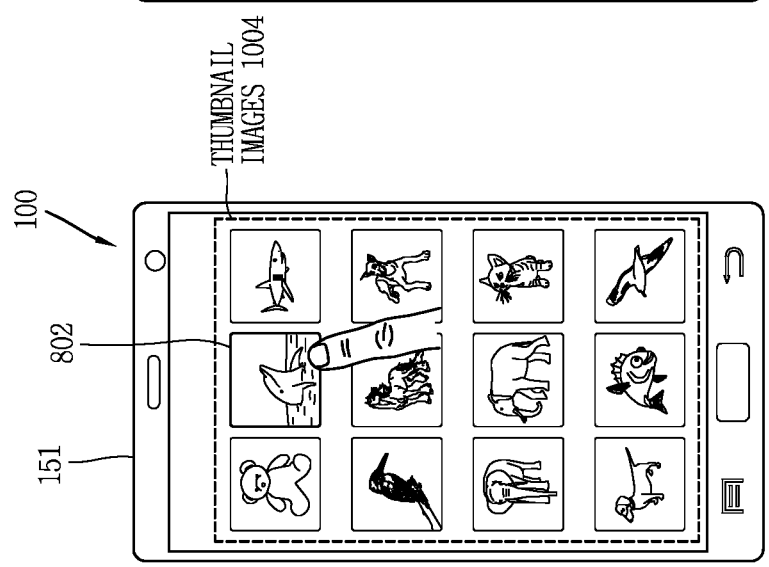
Figure 10C:
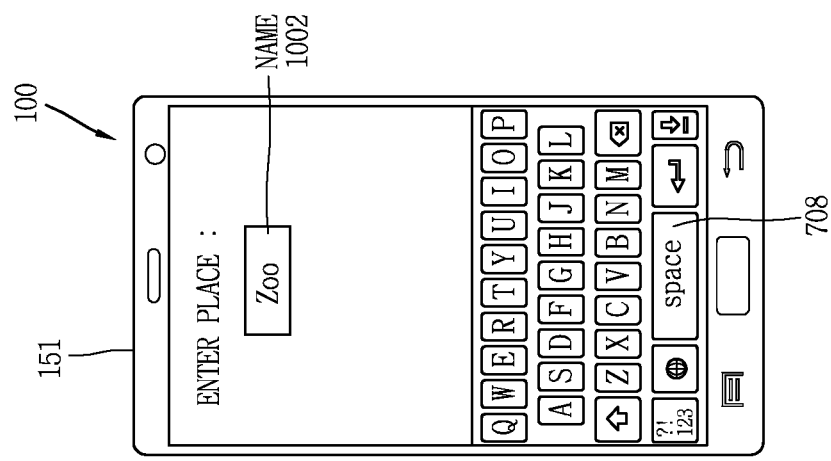

FIGS. 10*a*-10*c* illustrate exemplary views of the mobile terminal 100 selecting an expected object from a group of thumbnail images associated with a search word, according to one embodiment. In FIG. 10*a*, a search word (e.g., a name 1002) for selecting one or more images of the expected object is received by the mobile terminal 100. In one exemplary implementation, the user may type the name 1002 using the key board 708. In another exemplary implementation, the user may enter the name 1002 using a voice command. In FIG. 10*b*, one or more candidate thumbnail images 1004 associated with the search word are displayed on the display unit 151 in response to the receipt of the search word. In addition, when the thumbnail image 802 of the dolphin is selected by the user input, the image of the dolphin 710 is generated as the image of the expected object.

Figure 11C:
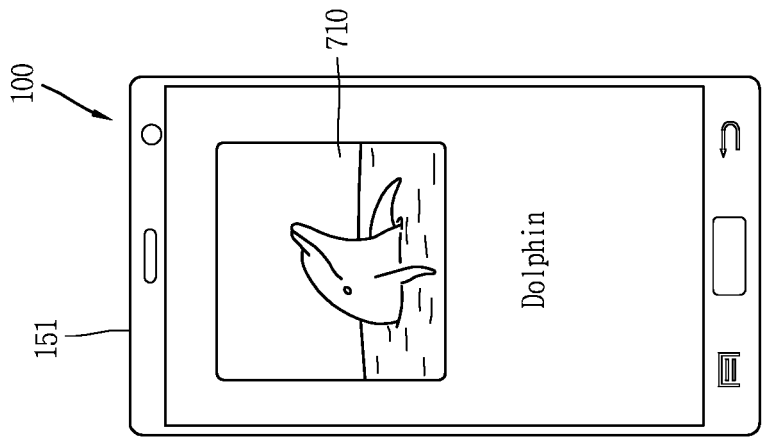
FIGS. 11a-11c illustrate exemplary views of the mobile terminal selecting an expected object from a group of thumbnail images associated with a location, according to one embodiment.
Figure 11B:
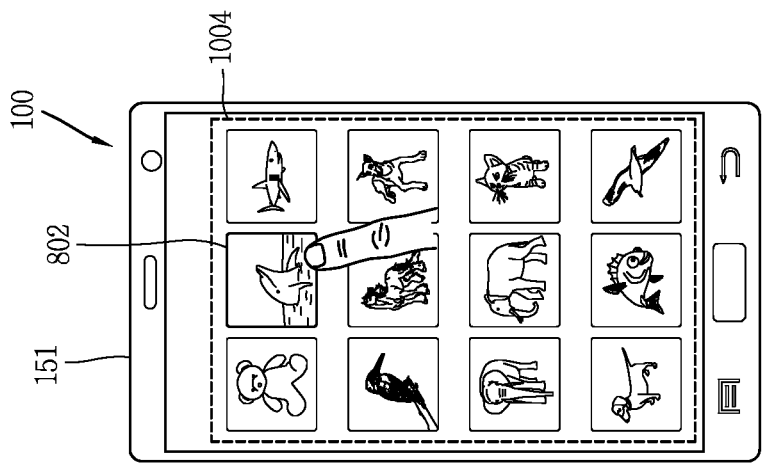
Figure 11A:
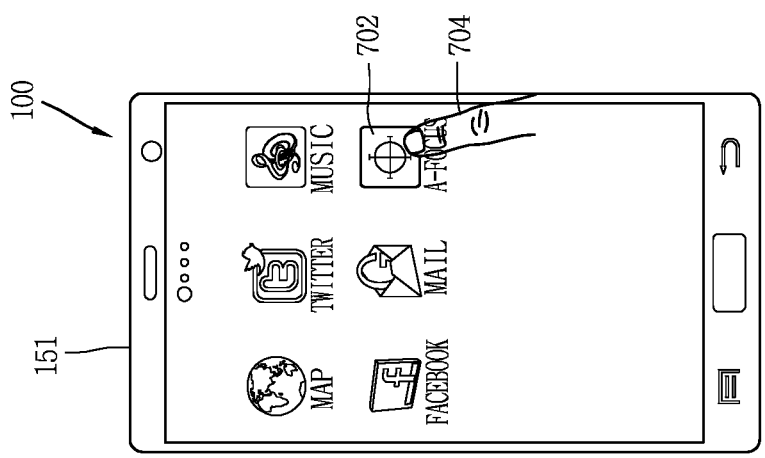

FIGS. 11*a*-11*c* illustrate exemplary views of the mobile terminal 100 selecting an expected object from a group of thumbnail images associated with a location, according to one embodiment. In FIG. 11*a*, when the application for automatic recognition and capture of an expected object is executed by touching the icon 702, a location of the mobile terminal 100 may be determined by using a communication module (e.g., a GPS module) of the mobile terminal 100. As illustrated in FIG. 11*b*, multiple candidate thumbnail images 1004 associated with the location are displayed. For example, when the GPS module of the mobile terminal 100 determines that the present location of the mobile terminal 100 is at or near a zoo, the thumbnail images 1004 associated with the zoo are displayed on the display unit 151. In FIG. 11*c*, when the thumbnail image 802 of the dolphin is selected by the user, the image 710 of the dolphin is displayed as the image of the expected object.

FIG. 12 illustrates an exemplary view of the mobile terminal 100 automatically recognizing an expected object, according to one embodiment. In FIG. 12, in order to automatically recognize an object 1202 (e.g., a jumping dolphin), the object 1202 is first compared with the image 710 of the dolphin, which was set earlier as the expected object. When the recognition rate of the object 1202 to match the expected object is less than the threshold level, the mobile terminal 100 accesses the Internet to obtain more information from external sources (e.g., a server 1206A-1206N) to assist the recognition of the object 1202. In the process, the image of the object 1202 may be compared with one or more images associated with the image of the expected object. When the image of the object 1202 matches with a combination of the image of the expected object and the one or more images or other information associated with the image of the expected object beyond the threshold value, a match indication is generated.

The information related matching an object with its expected object may be configured as a database. The database may be updated through learning taken place through numerous repetitions for recognizing of the objects and comparing the objects with the expected objects configured in the mobile terminal 100 as well as with additional information from external sources (e.g., the Internet). As a result of the learning, the successful matching of the object with the expected object may be improved progressively such that the threshold level for recognizing the object to be the expected object may be lowered accordingly.

Figure 13A:
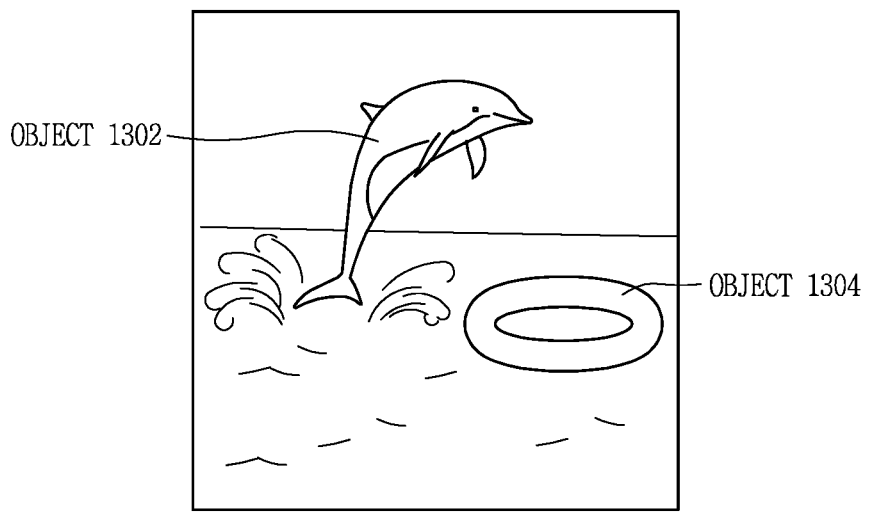
FIGS. 13a and 13b illustrate exemplary views of the mobile terminal automatically recognizing two expected objects, according to one embodiment.
Figure 13B:
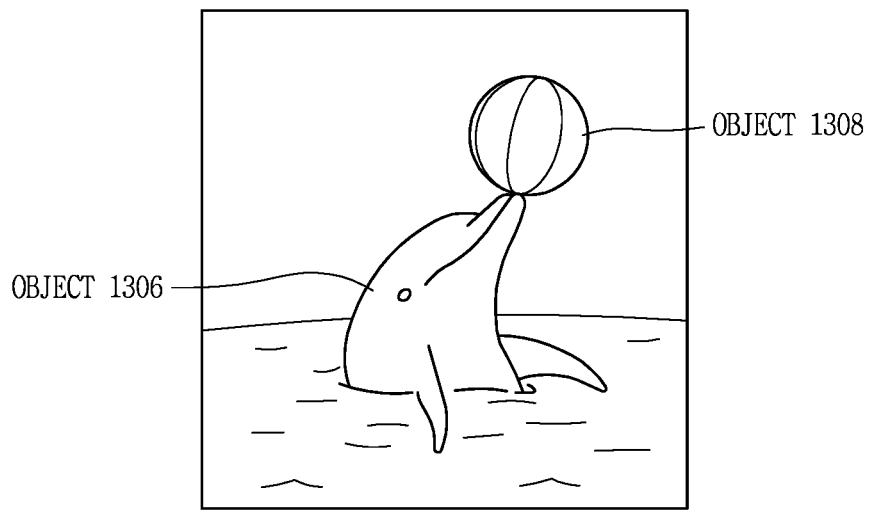

FIGS. 13*a* and 13*b* illustrate exemplary views of the mobile terminal 100 automatically recognizing two expected objects, according to one embodiment. In FIG. 13*a*, there are an object 1302 (e.g., a jumping dolphin) and an object 1304 (e.g., a swing ring or inner tube). If the expected objects were selected according to FIG. 9*a* for automatic recognition and capture and the AND condition was selected, the object 1302 may be recognized when the object 1302 is compared against the first expected object (e.g., the image 710 of the dolphin), whereas the object 1304 may not be recognized when compared with the second expected object (e.g., the image 902 of the beach ball). Accordingly, no picture may be taken. However, if the OR condition was selected instead, then only the picture of the object 1302 may be taken.

In FIG. 13*b*, there are an object 1306 (e.g., a partially submerged dolphin) and an object 1308 (e.g., a beach ball). If the expected objects were selected according to FIG. 9*a* for automatic recognition and capture and either the AND or OR condition was selected, the object 1306 and the object 1308 may be recognized when the object 1306 and the object 1308 are compared and matched with the first expected object (e.g., the image 710 of the dolphin) and the second expected object (e.g., the image 902 of the beach ball), respectively. Accordingly, the picture of the object 1306 and the object 1308 may be taken afterward. In one exemplary implementation, the picture may be taken when the indication that there is a match between the object (e.g., the object 1302, the object 1304, the object 1306, or the object 1308) and the expected object (e.g., the image 710 of the dolphin or the image 902 of the beach ball) is confirmed by pressing the master button 402 of the mobile terminal 100, by touching the screen or the display unit 151, or by uttering a voice command.

Figure 14A:
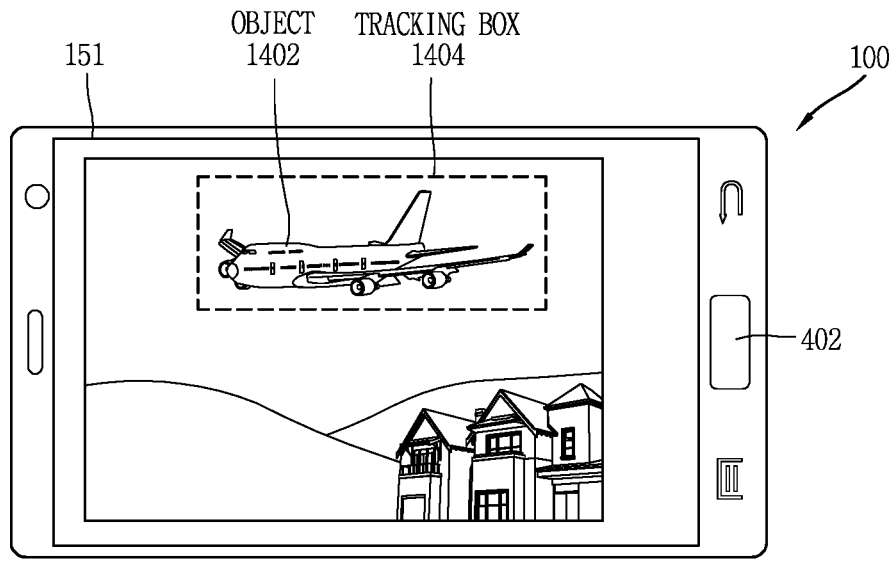
FIGS. 14a-14d illustrate exemplary views of the mobile terminal tracking and capturing an expected object, according to one embodiment.

FIGS. 14*a*-14*d* illustrate exemplary views of the mobile terminal 100 tracking and capturing an expected object, according to one embodiment. In one embodiment, upon recognition of an object as the expected object, a match indication distinguishing the object is displayed on the display unit 151. In one exemplary implementation, the match indication comprises a dotted line, a distinguishing color, an emphatic mark, an alert sound, a vibration, or an alert light. In FIG. 14*a*, when an object 1402 (e.g., a plane) displayed on the display unit 151 matches with the expected object beyond the threshold level, the object 1402 may be distinguished by a tracking box 1404 of the dotted lines. In addition, the mobile terminal 100 may generate a vibration, an alert sound, and/or a flashing light.

Figure 14B:
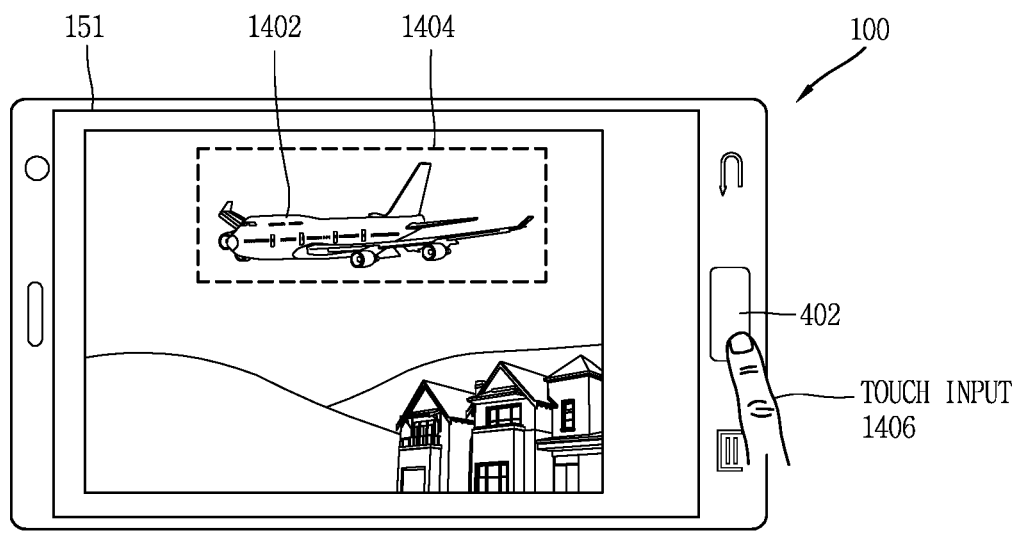
Figure 14C:
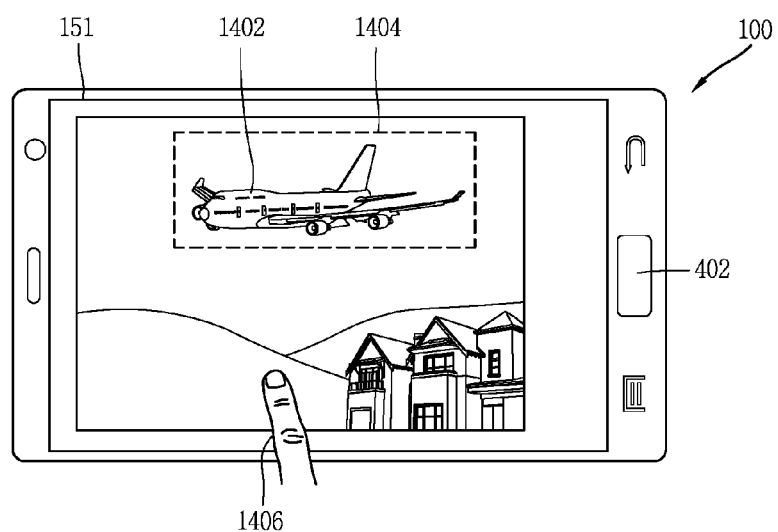
Figure 14D:
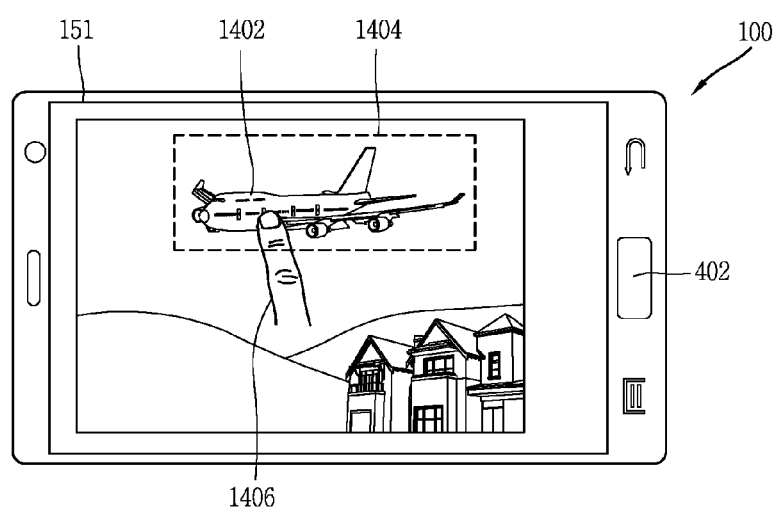

In one embodiment, when the match indication is generated, the confirmation of the match indication is automatically performed. In one embodiment, the confirmation of the match indication is performed in response to a user input thereof. In FIG. 14*b*, the confirmation of the match indication is performed by pressing the master button 402 using a touch input 1406. As a result, the image of the object 1402 is captured. In FIG. 14*c*, the confirmation of the match indication is performed to capture the image of the object 1402 by touching the screen or display unit 151 which displays the image of the object 1402. As a result, the image of the object 1402 is captured. In FIG. 14*d*, the confirmation of the match indication is performed to capture the image of the object 1402 by touching an area inside the tracking box 1404 distinguishing the image of the object 1402. In one exemplary implementation, only the image of the object 1402 within the tracking box 1402 may be captured automatically or upon the confirmation of the match indication. In another exemplary implementation, the image of the object 1402 as well as its surrounding displayed on the display unit 151 may be captured automatically or upon the confirmation of the match indication.

FIG. 15 illustrates an exemplary view of the mobile terminal 100 automatically recognizing an expected object and a characteristic of the expected object, according to one embodiment. In one embodiment, upon recognition of an object as the expected object and a characteristic of the object (e.g., ILY sign), match indications distinguishing the object and the characteristic are displayed on the display unit. In one exemplary implementation, the match indication comprises a dotted line, a distinguishing color, an emphatic mark, an alert sound, a vibration, or an alert light.

In FIG. 15, when an object 1502 (e.g., a woman) displayed on the display unit 151 matches with the expected object beyond the threshold level, the object 1502 is distinguished by the dotted lines. Further, when a characteristic 1504 of the object 1502 matches with the expected characteristic of the expected object, the characteristic 1504 is distinguished by the dotted lines. Alternatively, a box of the dotted lines may surround both the object 1502 and the characteristic 1504 when they match the expected object and characteristic. In addition, the mobile terminal 100 may generate a vibration, an alert sound, and/or a flashing light. Once the object 1502 and the characteristic 1504 are recognized to match the expected object and characteristic, the image of the object 1502 and the characteristic 1504 may be captured automatically or upon confirmation of the match indication.

FIG. 16 illustrates a process flow chart of an exemplary method executed by the mobile terminal 100 to automatically recognize and capture an object, according to one embodiment. In operation 1602, one or more images of an expected object is set or selected in response to a user input thereof. In operation 1604, an image of an object is received via a camera module of the mobile terminal. In operation 1606, a match indication is generated when the image of the object matches with the at least one image of the expected object beyond a threshold value. In operation 1608, the image of the object is captured upon confirmation of the match indication.

In one embodiment, the image(s) of the expected object is set by receiving a search word for selecting the image(s) of the expected object, displaying a plurality of candidate thumbnail images associated with the search word, and generating the image of the expected object(s) in response to an input selecting at least one candidate thumbnail images corresponding to the image(s) of the expected object. In one embodiment, the image(s) of the expected object is set by determining a location of the mobile terminal using a GPS module of the mobile terminal, displaying a plurality of candidate thumbnail images associated with the location, generating the image(s) of the expected object in response to an input selecting at least one candidate thumbnail images corresponding to the image(s) of the expected object.

In one embodiment, the match indication is generated by accessing the Internet when the image of the object does not match with the image(s) of the expected object beyond the threshold value, and comparing the image of the object with at least one image associated with the image(s) of the expected object when the at least one image is accessed via the Internet. Further, the match indication is generated when the image of the object matches with a combination of the image(s) of the expected object and the at least one image associated with the image(s) of the expected object beyond the threshold value.

It is also appreciated that the methods disclosed in FIG. 16 may be implemented in a form of a machine-readable medium embodying a set of instructions that, when executed by a machine, cause the machine to perform any of the operations disclosed herein.

Figure 17:
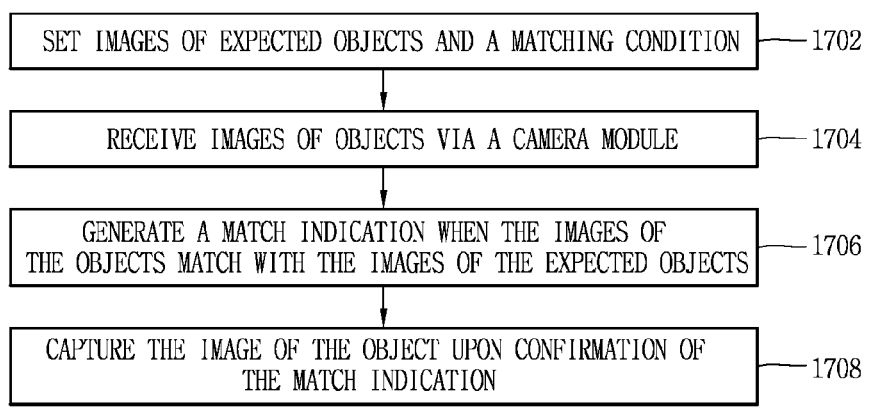
FIG. 17 illustrates a process flow chart of another exemplary method executed by the mobile terminal to automatically recognize and capture an object, according to one embodiment.

FIG. 17 illustrates a process flow chart of another exemplary method executed by the mobile terminal 100 to automatically recognize and capture an object, according to one embodiment. In operation 1702, an image of a first expected object, an image of a second expected object, and a matching condition are set or selected in response to a user input thereof. In operation 1704, an image of a first object and an image of a second object are received via a camera module of the mobile terminal. In operation 1706, a match indication is generated when the image of the first object and the image of the second object match with the image of the first expected object and the image of the second expected object according to the matching condition. In operation 1708, the image of the object is captured upon confirmation of the match indication.

In one embodiment, the matching condition is satisfied when the image of the first object matches with the image of the first expected object beyond a first threshold value and when the image of the second object matches with the image of the second expected object beyond a second threshold value. In one embodiment, the matching condition is satisfied when the image of the first object matches with the image of the first expected object beyond a first threshold value, or when the image of the second object matches with the image of the second expected object beyond a second threshold value.

It is also appreciated that the methods disclosed in FIG. 17 may be implemented in a form of a machine-readable medium embodying a set of instructions that, when executed by a machine, cause the machine to perform any of the operations disclosed herein.

The various devices, modules, analyzers, generators, etc. described herein may be enabled and operated using hardware circuitry (e.g., complementary metal-oxide-semiconductor (CMOS) based logic circuitry), firmware, software and/or any combination of hardware, firmware, and/or software (e.g., embodied in a machine readable medium). Further, the various electrical structure and methods may be embodied using transistors, logic gates, and/or electrical circuits (e.g., application specific integrated circuit (ASIC)). Although the present embodiments have been described with reference to specific example embodiments, it will be evident that various modifications and changes may be made to these embodiments without departing from the broader spirit and scope of the various embodiments.

What is claimed is:

1. A mobile terminal, comprising:
   a display unit;
   a memory;
   a GPS module;
   a camera module; and a controller configured to:
: determine a location of the mobile terminal using the GPS module;
display a plurality of images of objects associated with the location on the display unit;
select an image of an expected object from the plurality of images of objects associated with the location in response to a user input thereof;
display an image of an object received through the camera module on the display unit;
display a match indication visually distinguishing the object on the image of the object when the image of the object is determined to be similar with the image of the expected object beyond a threshold value; and
capture the image of the object upon a confirmation of the match indication,
wherein the plurality of images of objects are pre-registered to a mapping table stored in the memory through selecting each of the plurality of image of objects and through identifying of the plurality of images of objects with a name.

2. The mobile terminal of claim 1, wherein the match indication comprises at least one of a dotted line, a distinguishing color, an emphatic mark, an alert sound, a vibration, or an alert light.

3. A method of a mobile terminal, the method comprising:
: determining, using a GPS module of the mobile terminal, a location of the mobile terminal;
displaying, on a display unit of the mobile terminal, a plurality of images of objects associated with the location;
selecting an image of an expected object from the plurality of images of objections associated with the location in response to a user input thereof;
displaying, on the display unit of the mobile terminal, an image of an object received through a camera module of the mobile terminal
displaying, on the display unit, a match indication visually distinguishing the object on the image of the object when the image of the object is determined to be similar with the image of the expected object beyond a threshold value; and
capturing the image of the object upon confirmation of the match indication,
wherein the plurality of images of objects are pre-registered to a mapping table stored in the memory of the mobile terminal through selecting each of the plurality of images of objects and through identifying the each of the plurality of images of objects with a name.

4. The method of claim 3, wherein the displaying the plurality of images of objects comprises:
: displaying the plurality of images of objects associated with the location in thumbnail images; and
generating the image of the expected object in response to an input selecting one of the plurality of images of objects corresponding to the image of the expected object.

5. The method of claim 3, wherein the displaying the match indication comprises:
: accessing the Internet when the image of the object does not match with the image of the expected object beyond the threshold value; and
comparing the image of the object with at least one image associated with the image of the expected object when the at least one image is accessed via the Internet,
wherein the match indication is generated when the image of the object matches with a combination of the image of the expected object and the at least one image associated with the image of the expected object beyond the threshold value.

6. The method of claim 3, wherein the match indication comprises at least one of a dotted line, a distinguishing color, an emphatic mark, an alert sound, a vibration, or an alert light.

7. A method of a mobile terminal, the method comprising:
: determining a location of the mobile terminal using a GPS mobile of the mobile terminal;
displaying a plurality of images of objects associated with the location on a display unit of the mobile terminal;
selecting an image of a first expected object, an image of a second expected object, and a matching condition in response to a user input thereof, wherein the selecting of the matching condition is performed by pressing at least one of an AND button or an OR button displayed on a display of the mobile terminal, and wherein the image of the first expected object and the image of the second expected object are selected from the plurality of images of objects associated with the location;
displaying, on the display unit of the mobile terminal, an image of a first object and an image of a second object received through a camera module of the mobile terminal;
displaying, on the display unit, match indications visually distinguishing the first object and the second object on the image of the first object and the image of the second object when the image of the first object and the image of the second object are similar with the image of the first expected object and the image of the second expected object beyond a threshold value; and
capturing at least one of the image of the first object or the image of the second object upon confirmation of the match indications,
wherein the plurality of images of objects are pre-registered to a mapping table stored in a memory of the mobile terminal through selecting each of the plurality of images of objects and through identifying the each of the plurality of images of objects with a name.

8. The mobile terminal of claim 1, wherein the image of the object is automatically captured when the match indication including the image of the object is displayed on the display unit.

9. The method of claim 3, wherein the image of the object is automatically captured when the match indication including the image of the object is displayed on the display unit.

10. The method of claim 7, wherein the image of the first object and the image of the second object are automatically captured when the match indications are displayed on the display unit.

* * * * *